(12) United States Patent
Leussink

(10) Patent No.: US 8,826,063 B2
(45) Date of Patent: Sep. 2, 2014

(54) ELECTRONIC DEVICE WITH REDUCED POWER CONSUMPTION IN EXTERNAL MEMORY

(75) Inventor: Steven Frederik Leussink, Utrecht (NL)

(73) Assignee: Dialog Semiconductor B.V., MV's-Hertogenbosch (NL)

( * ) Notice: Subject to any disclaimer, the term of this patent is extended or adjusted under 35 U.S.C. 154(b) by 195 days.

(21) Appl. No.: 12/944,443

(22) Filed: Nov. 11, 2010

(65) Prior Publication Data

US 2011/0119522 A1    May 19, 2011

(30) Foreign Application Priority Data

Nov. 13, 2009   (EP) ................................... 09175962

(51) Int. Cl.
*G06F 1/04*     (2006.01)
*G06F 13/42*    (2006.01)
*G06F 1/32*     (2006.01)

(52) U.S. Cl.
CPC ......... *G06F 13/4243* (2013.01); *Y02B 60/1225* (2013.01); *G06F 1/3203* (2013.01); *Y02B 60/1217* (2013.01); *Y02B 60/1235* (2013.01); *G06F 1/3275* (2013.01)
USPC ...................................................... 713/600

(58) Field of Classification Search
CPC ...... G06F 2207/3888; G06F 9/00; G06F 1/04
USPC ...................................................... 713/600
See application file for complete search history.

(56) References Cited

U.S. PATENT DOCUMENTS

| 5,604,884 | A | * | 2/1997 | Thome et al. ................. 711/167 |
| 6,073,223 | A | | 6/2000 | McAllister et al. |
| 6,384,651 | B1 | | 5/2002 | Horigan |
| 2006/0031692 | A1 | | 2/2006 | Kato et al. |
| 2007/0183192 | A1 | | 8/2007 | Barnum et al. |

(Continued)

FOREIGN PATENT DOCUMENTS

EP          1 653 331         11/2010

OTHER PUBLICATIONS

European Search Report—10190744.20—1229/2323008, Mail date—Sep. 2, 2011.

(Continued)

*Primary Examiner* — Kim Huynh
*Assistant Examiner* — Austin Hicks
(74) *Attorney, Agent, or Firm* — Saile Ackerman LLC; Stephen B. Ackerman

(57) ABSTRACT

An electronic device for data processing is disclosed having a CPU (3), a Closely Coupled Memory (5), an external memory system (8), and a first clock unit (1) and second clock unit (9) for receiving a main clock signal (2) and converting the main clock signal (2) into a first clock signal (6) for at least the Central Processing Unit (3) and Closely Coupled Memory (5) and a second clock signal (10) for the external memory (8). The first clock signal has a first clock frequency and the second clock signal has a second clock frequency being higher than said first clock frequency and wherein the device is configured to switch per time unit the external memory for an active period $T_{active}$ in an active state and for a standby period $T_{standby}$ in a standby state to retrieve a predetermined amount of data from the external memory per time unit.

8 Claims, 2 Drawing Sheets

(56) References Cited

U.S. PATENT DOCUMENTS

2008/0005607 A1    1/2008  Fukatsu
2008/0028250 A1*   1/2008  McDevitt et al. ............ 713/501
2008/0183956 A1*   7/2008  Mayer et al. ................ 711/105

OTHER PUBLICATIONS

Search Report for European Patent Application No. 09175962.1-1229, dated Mar. 4, 2010.

* cited by examiner

ELECTRONIC DEVICE WITH REDUCED POWER CONSUMPTION IN EXTERNAL MEMORY

PRIORITY CLAIM

This application claims priority under 35 U.S.C. 119(a) to European Application No. 09175962.1, entitled "ELECTRONIC DEVICE WITH REDUCED POWER CONSUMPTION IN EXTERNAL MEMORY," filed Nov. 13, 2009, and which application is herein incorporated by reference.

BACKGROUND OF THE INVENTION

Many electronic devices have an embedded processor with several types of memory connected through a bus. Usually there are several stages of memory connected to the processor, varying in size and speed.

As is shown in FIG. 1, a typical, prior art version of such an electrical device contains a Central Processing Unit (CPU) 3 for processing and controlling the whole electrical device, a Closely Coupled Memory (CCM) 5 for storing data and/or instructions, an external memory system 8 comprising external memory as well as a related external memory bus controller 13 and which external memory 8 is arranged for storing data and/or instructions. A clock unit 1 receives a master clock signal 2 for generating a main system clock signal 6 for the electrical device, i.e. for the CPU 3, the CCM 5 and the external memory 8. The device comprises an internal memory bus 4 for connecting the CPU 3 with the CCM 5, and an external memory bus 7 for connecting the CCM 5 with the external memory 8.

The memory bus controller 13 is integrated on the chip and is connected to the CPU 3 to receive read and write instructions from CPU 3. After having received a read request from CPU 3, memory bus controller 13 retrieves the requested data from external memory 7 for CCM 5. CCM 5 is arranged to receive that data and to store it at a predetermined memory location where CPU 3 can access it.

The CPU 3, the clock unit 1, the CCM 5 and the memory bus controller 13 are integrated in one single chip 14 (embedded). The CCM 5 is the smallest and fastest type of memory. The CCM 5 is optimized for speed rather than size. As the CCM 5 is integrated into the device, the cost per byte is relatively high. The external memory 8 is connected to the CCM 5 through external memory bus 7. The external memory 8 can be cost optimized for size and is usually slower than the integrated CCM 5. The electrical device is clocked by master clock signal 2. The clock unit 1 converts the master clock signal 2 into a faster version of the master clock signal 2 (e.g. by a Phase Locked Loop) or a slower version of master clock signal 2 (e.g. by a Clock Divider). The input of clock unit 1 is the master clock signal 2 and the output of clock unit 1 is the main system clock signal 6. The main system clock signal 6 clocks the CPU 3, CCM 5, external memory controller 13 and external memory 8.

The power $Pccm_{active}$ consumed by the CPU 3, CCM 5 and other components on the chip which are active when the device is active consists of two components. One being a static power consumption $Pccm_{static}$ and the second one being a dynamic power consumption $Pccm_{dynamic}$, which is dependent on the speed on which the device is operated. The following formula holds:

$$Pccm_{active}=Pccm_{static}+Pccm(f_{clock})_{dynamic} \qquad (1)$$

In this formula,
$Pccm(f_{clock})_{dynamic}$ is a function of $f_{clock}$:
$Pccm(f_{clock})_{dynamic}=f_{clock}*A_{Pdyn(CCM)}$
Where:
$A_{Pdyn(CCM)}$ is a constant with unit [W/Hz],
$f_{clock}$=frequency of main system clock signal 6 in Hz as received by CCM 5.

From the formula it is clear that minimum power consumption for components in the system which are active when the device is active is achieved when $f_{clock}$ is as low as possible. Therefore, the main system clock signal 6 is designed to be equal to or slower than the master clock signal 2 for the sake of conserving power. By making the main system clock signal 6 slower than the master clock signal 2, the dynamic power consumption of components which are active when the device is active, such as CPU 3 and CCM 5, will be lower than the situation when the main system clock signal 6 is the same as the master clock signal 2. When the CCM 5 is used as a cache memory, the processor 3 will fetch a high percentage of its instructions from CCM 5 over internal memory bus 4 (in the order of 90% or higher) and only few instructions need to be fetched from the external memory 8 over external memory bus 7. In this way, the average bus speed will be close to the speed of internal memory bus 4 as most instructions are fetched from the fast CCM 5. Fetching the remaining instructions from the external memory 8 is relatively slow, but since the number of instructions is limited this has a minor impact on the average bus speed.

The power $Pext_{active}$ consumed by the external memory 8 while active consists of two components. One being the static power consumption $Pext_{static}$ which is always present when the device is active, for example when the device is selected by means of a chip_select signal or chip_enable signal. The second one being the dynamic power consumption $Pext_{dynamic}$, which is dependent on the speed, i.e. the clock frequency, the device is operated.

$$Pext_{active}=Pext_{static}+Pext(f_{clock})_{dynamic} \qquad (2)$$

In this formula,
$Pext(f_{clock})_{dynamic}$ is a function of $f_{clock}$:
$Pext(f_{clock})_{dynamic}=f_{clock}*A_{Pdyn(ext)}$
Where:
$A_{Pdyn(ext)}$ is a constant with unit [W/Hz],
$f_{clock}$=frequency of main system clock signal 6 in Hz as received by external memory 8.

The total power consumption consumed by the external memory 8 while inactive consists of one component; i.e. the standby power consumption $Pext_{standby}$. It is commonly known that the standby power consumption $Pext_{standby}$ is smaller than the static power consumption $Pext_{static}$.

The total power $Pext_{total}$ consumed by the external memory device 8 is equal to the active power consumption $Pext_{active}$ multiplied by the relative active period $T_{active}$ (defined as part per unit time) plus the standby power consumption $Pext_{standby}$ multiplied by the relative standby period $T_{standby}$ (defined as part per unit time). So, $T_{active}+T_{standby}=1$, and:

$$\begin{aligned}Pext_{total} &= T_{active}*(Pext_{static}+Pext(f_{clock})_{dynamic})+ \\ &\quad T_{standby}*(Pext_{standby}) \\ &= T_{active}*(Pext_{static}+f_{clock}*A_{Pdyn(ext)})+ \\ &\quad (1-T_{active})*(Pext_{standby}) \\ &= T_{active}*(Pext_{static}+f_{clock}*A_{Pdyn(ext)}-Pext_{standby})+ \\ &\quad Pext_{satndby}\end{aligned} \qquad (3)$$

Assume the amount of data per time unit retrieved is a linear function of the frequency $f_{clock}$ of the main system clock signal 6 as received by external memory 8, then the relative active period $T_{active}$ can be expressed as follows when retrieving N bytes:

$$T_{active} = C_0 * N / f_{clock} \qquad (4)$$

Where $C_0$=constant [HZ]
When accessing the external memory 8 we may assume these N bytes can consist of either the following items or a combination of the following items:

A command (write/read/status/ . . . )
An address (which byte or data the command has to operate on)
Data (actual payload)

The access format to the external memory is not limited to the above items.

This means:

$$\begin{aligned}
Pext_{total} &= C_0 * N / f_{clock} * \\
&\quad (Pext_{static} + f_{clock} * A_{Pdyn(ext)} - Pext_{standby}) + \\
&\quad Pext_{standby} \\
&= C_0 * N * \\
&\quad (Pext_{static} / f_{clock} + A_{Pdyn(ext)} - Pext_{standby} / f_{clock}) + \\
&\quad Pext_{standby}
\end{aligned} \qquad (5)$$

Given that $Pext_{static}$, $A_{Pdyn(ext)}$ and $P(ext)_{standby}$ are constants, the formula can be written as:

$$Pext_{total} = C_0 * N * (C_1 / f_{clock} + C_2) + C_3 \qquad (6)$$

Where:
$C_1 = Pext_{static} - Pext_{standby}$
$C_2 = A_{Pdyn(ext)}$
$C_3 = Pext_{standby}$ From the formula it is clear that minimum power consumption is achieved when $f_{clock}$ is as high as possible, for any given amount of data N per time unit. However, this is in direct conflict with formula (1) which states the minimum power consumption of components in the system which are active when the system is active can be achieved by using a low $f_{clock}$.

SUMMARY OF THE INVENTION

The object of the invention is to reduce the overall system power consumption while still operating the device at a suitable, acceptable speed.

This object is obtained by a device as claimed in claim 1.

The invention is based on the insight that the lowest current consumption of the device comprising internal components and an external memory can be achieved by clocking the internal components at the lowest clock speed possible to preform the necessary actions on the CPU and the external memory at the highest speed possible. When the internal components including the CPU are running at a low clock, the average amount of data per time unit to be retrieved from the external memory will be much lower than the maximum amount of data per time unit that can be retrieved from the external memory. One skilled in the art could decide to clock the external memory with a low clock which is suitable to retrieve the average amount of data per time unit from the external memory. However, by using a clock for the external memory with a clock frequency which is higher than the clock frequency of the internal components, more particularly the CPU, the average amount of data per time unit could be retrieved from the external memory in a short time in said time unit. This allows the device to switch the external memory from active state to standby state, which consequently results in a reduction of the overall system power consumption as explained above.

It should be noted that EP1653331A2 discloses a system with a memory clock and a processor clock. In a sleep state which corresponds to a low power mode, the processor clock and memory clock are power down. Said document does not disclose the relationship between the processor clock and memory clock when the processor is running at a relative low frequency with respect to its normal frequency.

U.S. Publication No. 2008/0005607 discloses a method of controlling an information processing device. A controlling unit decreases the frequencies of the CPU when a cache hit rate is low, and increases the frequencies of the CPU when the cache hit rate is high. Furthermore, the controlling unit increases the frequencies of the Memory clock when a cache hit rate is low, and decreases the frequencies of the CPU when the cache hit rate is high. It does not disclose that the memory is switched between an active state and standby state to reduce power when the processor is running at a particular frequency.

U.S. Publication No. 2007/0183192 discloses a system wherein a memory is driven by a constant memory clock and a processor is driven by a variable processor clock.

U.S. Pat. No. 6,384,651 B1 discloses a system with a processor and memory clock which are switched on and off with a predefined duty cycle. The processor clock is in the hundreds of MHz and the MCLK is at 100 MHz.

BRIEF DESCRIPTION OF THE DRAWINGS

The invention will be explained in detail with reference to some drawings that are only intended to show embodiments of the invention and not to limit the scope. The scope of the invention is defined in the annexed claims and by its technical equivalents.

DETAILED DESCRIPTION OF EMBODIMENTS

Figure 1:
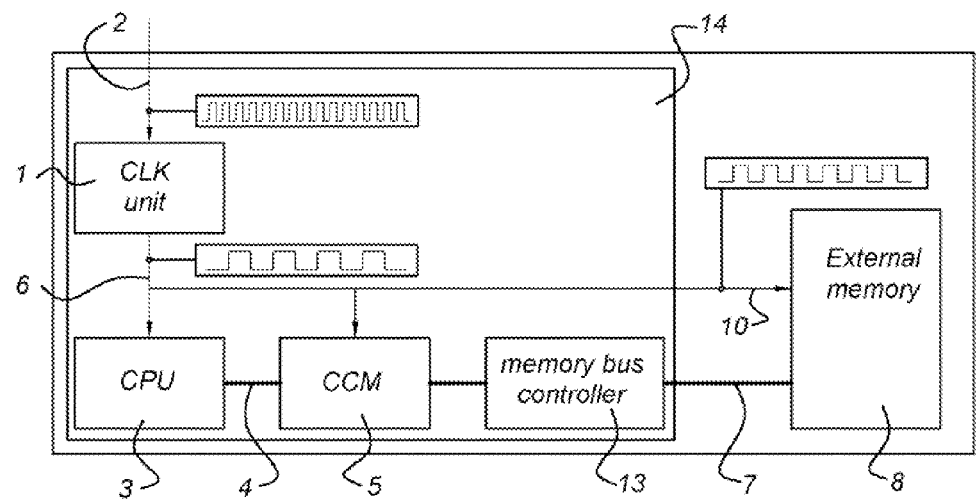
FIG. 1 is a simplified, prior art schematic view of an electronic device with a CPU, a clock unit and some memories.
Figure 2:
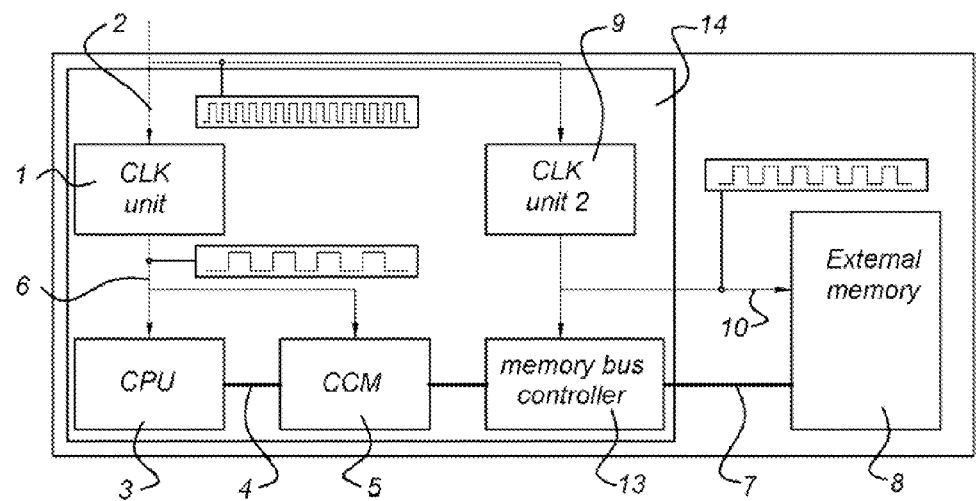
FIG. 2 is an example of an electronic device with a separate clock unit for the external memory according to the invention.

In FIG. 2, reference numbers which are the same as in FIG. 1 refer to the same components.

The device according to FIG. 2 comprises a separate clock unit 9 for generating a separate external clock signal 10 with an external clock frequency $f_{clock,10}$ to the external memory 8. The clock unit 9 receives clock signal 2 as input signal and derives external clock signal 10 from that clock signal 2. By doing so, the frequency $f_{clock,10}$ of clock signal 10 can be controlled separately from the clock frequency $f_{clock}$ of the clock signal 6. Thus, the frequency $f_{clock,10}$ of clock signal 10 can be made higher than the clock frequency $f_{clock}$ of the clock signal 6. Following equation (6), in the setup of FIG. 2, the total power consumption $Pext_{total}$ of the external memory 8 is:

$$Pext_{total} = C_0 * N * (C_1 / f_{clock,10} + C_2) + C_3 \qquad (6a)$$

To reduce the total power consumption $Pext_{total}$ of the external memory 8, the external clock frequency $f_{clock,10}$ should be made as high as possible and consequently providing the possibility to increase the relative standby period $T_{standby}$ of the external memory 8 and decreasing the relative active period $T_{active}$ of the external memory 8 within a time unit while still receiving a predetermined amount of data per time unit from the external memory. Preferably, the clock unit 9 is arranged to produce external clock signal 10 with an external clock frequency $f_{clock,10}$ as close as possible to the clock frequency of clock signal 2.

The clock unit 9 may, again be based on an implementation with a phase locked loop or a frequency divider. However, the invention is not restricted to such an embodiment.

In the setup of FIG. 2, the bus controller 13 receives the clock signal 10 as an input signal and is arranged to operate the transfer of data from external memory 8 to CCM 5 via external memory bus 7 at a maximum possible frequency.

FIG. 2 shows that both clock unit 1 and clock unit 9 receive clock signal 2 and produce their output clock signals based on this input signal. However, alternatively, clock unit 1 may be coupled to the output of clock unit 9 such as to receive clock signal 10 as an input and derive its output clock signal from clock signal 10. However, then clock signals 6 and 10 are not independently controlled.

Figure 3:
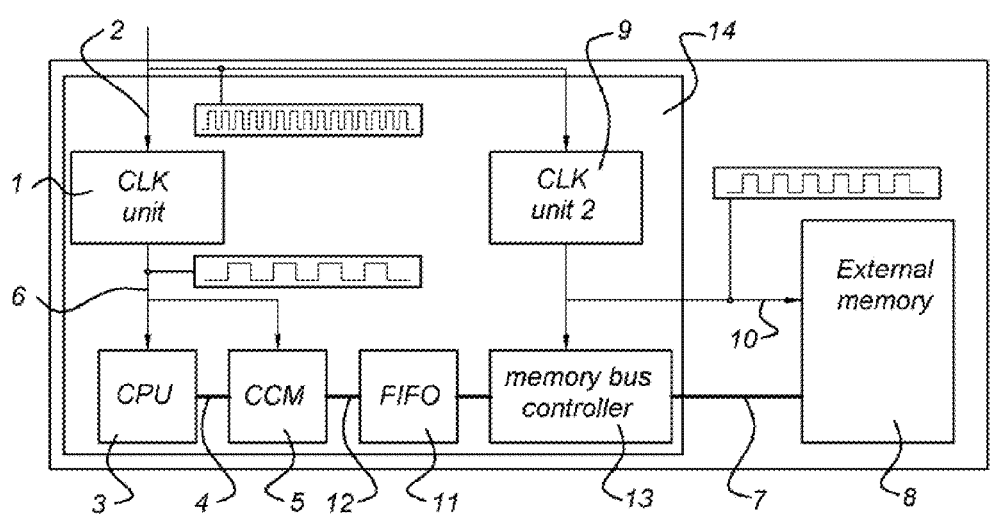
FIG. 3 shows an alternative embodiment of the invention.

FIG. 3 shows an alternative embodiment of the invention. In this embodiment, the same reference signs are used for the same components as in the preceding figures.

In addition to the embodiment of FIG. 2, the embodiment of FIG. 3 comprises a FIFO (First In First Out) buffer 11 between external memory bus 7 and CCM 5. The FIFO 11 is connected to external memory bus 7 and to a system bus 12 that is, at its other end, also connected to CCM 5. Bus controller 13 is connected to FIFO 11 too.

The system of FIG. 3 provides more flexibility because the FIFO arranges for synchronization of the speed of transfer of data at the output of external memory 8 to the speed of receipt of data at the input of CCM 5. By doing so, bus throughput differences between system bus 12 at the input of CCM 5 and external memory bus 12 at the output of external memory 8 are equalized. The way how such a FIFO operates is known to persons skilled in the art and does not need any further explanation here.

In the embodiments given above, the first clock unit 1 generates a first clock signal 6 having a first clock frequency. A second clock unit 9 generates a second clock signal 10 having a second clock frequency. In low power mode of the device, the second clock frequency is higher than the first clock frequency. For example the clock frequency of the first clock signal could be in the order of 100 kHz and the clock frequency of the second clock signal could be in the order of 10 MHz. To retrieve a predetermined amount of data from the external memory per time unit, the device is configured to switch per time unit the external memory for an active period $T_{active}$ in an active state and for a standby period $T_{standby}$ in a standby state. The first clock frequency of the first clock signal 6 is preferably as low as possible to allow the processor CPU 3 to perform the necessary actions defined by the instructions available in the closely coupled memory CCM 5. CCM 5 is for example a cache memory. The hit rate of instructions available in the CCM 5 will determine the amount of data per time unit that has to be retrieved from the external memory. The amount of data per time unit that has to be retrieved from the memory will decrease linearly with the decrease of the first clock frequency. By keeping the second clock frequency at the highest possible clock frequency or reducing the second clock frequency less than the first clock frequency in low power mode, the desired amount of data per time unit could be retrieved in bursts from the external memory and the external memory 8 could be switched in a standby state between two subsequent bursts. As the power consumption of the memory in active mode is higher than in standby mode, power will be saved by switching the external memory in standby mode. The external memory 8 could be switched between standby mode and active mode under control of a chip_select signal or chip_enable signal, which signals are known the person skilled in the art to control a memory device.

In the example given with a first clock signal of 100 kHz and a second clock signal of 10 MHz, for each instruction executed by the processor, there are 100 second clock cycles available to retrieve the amount of data from the external memory. It requires less than 100 clock cycles to retrieve one instruction from the external memory. During the remaining clock cycles of the 100 clock cycles, the external memory could be switches in the standby state, which is a less power consuming state than the active state, when the memory is selected.

In a further embodiment, the device is configured to disable the second clock signal when the memory is switched in the standby state. Disabling the second clock signal at the output of the second clock unit 9, reduces further the power consumption. The wires and bond paths from the output of the second clock unit 9 to the external memory 8 and memory bus controller are small capacitors which dissipate power when a clock signal is supplied to them. In this embodiment, the memory controller 13 will disable the second clock signal 10 or second clock unit 9. Circuitry running on the first clock signal 6 will enable the second clock signal 10 or second clock unit 9 to supply a clock signal with the second clock frequency to the external memory 8 and memory bus controller 13.

Normally, a single command to retrieve data from an external memory requests the external memory to reads and transmits more than one data element to the closely coupled memory via the memory bus controller 13 and the memory bus 7. A data element could be a specified number of bytes forming an instruction, a parameter or other data.

As in the time of one clock cycle of the first clock signal at most one instruction is needed from the external memory, the retrieval of the amount of data corresponding to one instruction is sufficient and the communication could be stopped after receipt of said amount of data even if the external memory would like to transmit further data elements in response to the received command. The communication between the memory bus controller and the external memory 8 could be stopped by deselecting the external memory by means of a chip-select signal or chip-enable signal.

The measures described hereinbefore for embodying the invention can obviously be carried out separately or in parallel or in a different combination or, if appropriate, be supplemented with further measures; it will in this case be desirable for the implementation to depend on the field of application of the device. It should be understood that although particular embodiments of the invention have been described by way of illustrating the invention, the invention includes all modifications and equivalents thereof falling within the scope of the appended claims.

What is claimed is:

1. An electronic device for data processing comprising:
a Central Processing Unit for data processing;
a Closely Coupled Memory for storing a first set of data and instructions;
an external memory system for storing a second set of data and instructions; and
a first clock unit for receiving a main clock signal having a main clock frequency and converting said main clock signal into a first clock signal for at least the Central Processing Unit and Closely Coupled Memory;

the Central Processing Unit, Closely Coupled Memory and the first clock unit being integrated in a single chip;

the Central Processing Unit being connected to the Closely Coupled Memory via an internal memory bus;

the external memory system being external to the single chip and connected to an external memory bus for at least transmitting data to said Closely Coupled Memory;

the electronic device further comprises a second clock unit arranged for receiving said main clock signal and converting said main clock signal into a second clock signal for the external memory system, characterized in that the first clock signal has a first clock frequency and the second clock signal has a second clock frequency, the second clock frequency being higher than said first clock frequency and wherein the device is configured to switch per time unit the external memory for an active period $T_{active}$ in an active state to retrieve a predetermined amount of data in a burst and for a standby period $T_{standby}$ in a standby state between two subsequent bursts, to retrieve a predetermined amount of data per time unit from the external memory in bursts.

2. The electronic device according to claim 1, wherein said second clock unit (9) is integrated in said single chip too.

3. The electronic device according to claim 1, wherein said second clock frequency is equal to the main clock frequency.

4. The electronic device according to any of the preceding claims, wherein said electronic device comprises a buffer arranged to buffer data transmitted from said external memory system to said Closely Coupled Memory.

5. The electronic device according to claim 4, wherein said buffer is also integrated in said single chip.

6. The electronic device according to claim 1, wherein the device is further configured to disable the second clock signal when the memory is switched in the standby state.

7. The electronic device according to claim 1, wherein the device further comprises a memory bus controller, wherein the memory bus controller is configured to switch the memory from the active state to the standby state when the predetermined amount of data is retrieved from the external memory.

8. The electronic device according to claim 7, wherein the memory bus controller is clocked by the second clock signal.

\* \* \* \* \*